(12) United States Patent
Shinano et al.

(10) Patent No.: US 10,606,023 B2
(45) Date of Patent: Mar. 31, 2020

(54) LENS BARREL

(71) Applicant: Panasonic Intellectual Property Management Co., Ltd., Osaka (JP)

(72) Inventors: Fumio Shinano, Osaka (JP); Takeshi Sakakibara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/179,949

(22) Filed: Nov. 4, 2018

(65) Prior Publication Data

US 2019/0072743 A1   Mar. 7, 2019

Related U.S. Application Data

(63) Continuation of application No. PCT/JP2018/001518, filed on Jan. 19, 2018.

(30) Foreign Application Priority Data

Jan. 24, 2017  (JP) ................. 2017-010741

(51) Int. Cl.
*G02B 7/04* (2006.01)
*G02B 7/08* (2006.01)
(Continued)

(52) U.S. Cl.
CPC ............. *G02B 7/04* (2013.01); *G02B 7/08* (2013.01); *G02B 27/646* (2013.01); *G03B 5/00* (2013.01);
(Continued)

(58) Field of Classification Search
USPC ............ 396/82–55, 52–55; 348/208.99
See application file for complete search history.

(56) References Cited

U.S. PATENT DOCUMENTS 8,576,495 B2 * 11/2013 Li .................. G02B 7/102
359/695
2008/0285162 A1   11/2008 Fujita
(Continued)

FOREIGN PATENT DOCUMENTS

| JP | 4-15608 A | 1/1992 |
| JP | 2005-195912 A | 7/2005 |

(Continued)

OTHER PUBLICATIONS

International Search Report (ISR) dated Apr. 10, 2018 in International (PCT) Application No. PCT/JP2018/001518.
(Continued)

*Primary Examiner* — Clayton E. LaBalle
*Assistant Examiner* — Warren K Fenwick
(74) *Attorney, Agent, or Firm* — Renner, Otto, Boisselle & Sklar, LLP

(57) ABSTRACT

A lens barrel includes a first lens frame that holds a first lens; a second lens frame that holds a second lens, and holds the first lens frame movably along an optical axis; and a pair of linear units that drive the movement of the first lens frame along the optical axis. When seen in an optical axis direction, the pair of linear units are disposed along the outer circumference of the first lens frame, at mutually non-opposing positions across the optical axis.

9 Claims, 8 Drawing Sheets

(51) Int. Cl.
*G03B 5/00* (2006.01)
*G02B 27/64* (2006.01)
*G03B 5/02* (2006.01)
*G03B 17/14* (2006.01)
*H04N 5/225* (2006.01)

(52) U.S. Cl.
CPC ............... *G03B 5/02* (2013.01); *G03B 17/14* (2013.01); *H04N 5/2254* (2013.01)

(56) References Cited

U.S. PATENT DOCUMENTS

| | | |
|---|---|---|
| 2010/0067889 A1 | 3/2010 | Suzuki |
| 2014/0168798 A1 | 6/2014 | Ejima |
| 2016/0054538 A1 | 2/2016 | Kawamura |
| 2017/0192196 A1* | 7/2017 | Kobayashi ............... G02B 7/04 |

FOREIGN PATENT DOCUMENTS

| | | |
|---|---|---|
| JP | 2006-215521 A | 8/2006 |
| JP | 2007171299 A | 7/2007 |
| JP | 2010-072062 A | 4/2010 |
| JP | 2011-043705 A | 3/2011 |
| JP | 2015-127729 A | 7/2015 |
| JP | 2015-179206 A | 10/2015 |
| JP | 2016-045296 A | 4/2016 |
| WO | 2013027308 A1 | 2/2013 |
| WO | 2016/051617 | 4/2015 |

OTHER PUBLICATIONS

Office Action dated Jul. 23, 2019 for corresponding Japanese Patent Application No. 2018-536902, along with English language machine translation.

* cited by examiner

LENS BARREL

CROSS REFERENCE TO RELATED APPLICATION

This application is a U.S. continuation application of PCT International Patent Application Number PCT/JP2018/001518 filed on Jan. 19, 2018, claiming the benefit of priority of Japanese Patent Application Number 2017-010741 filed on Jan. 24, 2017, the entire contents of which are hereby incorporated by reference.

BACKGROUND

1. Technical Field

The present disclosure relates to a lens barrel.

2. Description of the Related Art

Japanese Unexamined Patent Application Publication No. 2015-127729 discloses a collapsible lens barrel that has a linear lens drive mechanism and includes a rotating barrel member which is rotatable about an optical axis and moves a movable lens group between a collapsed position and an image capturing position by rotating.

SUMMARY

The present disclosure provides a lens barrel that realizes high-speed auto-focus and can be miniaturized.

A lens barrel according to an aspect of the present disclosure includes: a first lens frame that holds a first lens; a second lens frame that holds a second lens, and holds the first lens frame movably along an optical axis; and a pair of first drivers that drive movement of the first lens frame along the optical axis. When seen in an optical axis direction, the pair of first drivers are disposed along an outer circumference of the first lens frame, at mutually non-opposing positions across the optical axis. The pair of first drivers each include: a first coil fixed to the first lens frame; and a first magnet fixed to the second lens frame. When seen in the optical axis direction, the first coil and the first magnet are aligned along the outer circumference of the first lens frame. The first coil of each of the pair of first drivers is disposed within a range defined by a longer distance out of two distances between the first magnets of the pair of first drivers along a circumferential direction of the first lens frame.

A lens barrel according to the present disclosure realizes high-speed auto-focus and can be miniaturized.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Hereinafter, exemplary embodiments are described in detail with reference to the drawings as necessary. However, there are instances where overly detailed description is omitted. For example, there are instances where detailed description of well-known matter and overlapping description of identical elements are omitted. This is to avoid making the subsequent description verbose, and thus facilitate understanding by a person having ordinary skill in the art. Furthermore, although expressions indicating relative directions or orientations such as parallel, perpendicular, orthogonal, and the like, are used in the subsequent description of the exemplary embodiments, there are also cases where these expressions do not strictly indicate such direction or orientation. For example, parallel means not only being perfectly parallel but also being substantially parallel, that is, including an error of approximately several percent, for example.

It should be noted the accompanying drawings and the subsequent description are provided by the inventors in order for a person having ordinary skill in the art to sufficiently understand the present disclosure, and are thus not intended to limit the subject matter recited in the claims.

1. Outline Configuration of Lens Barrel

Figure 1:
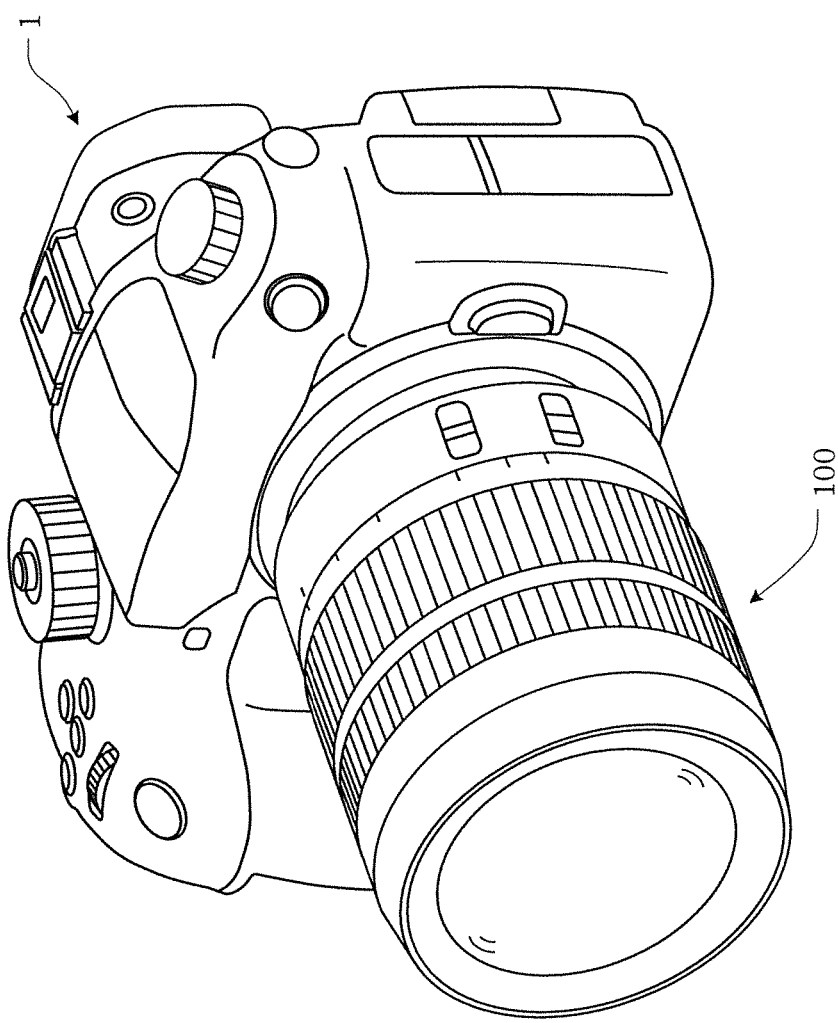
FIG. 1 is a perspective view of an outline configuration of a lens barrel according to an embodiment.
Figure 2:
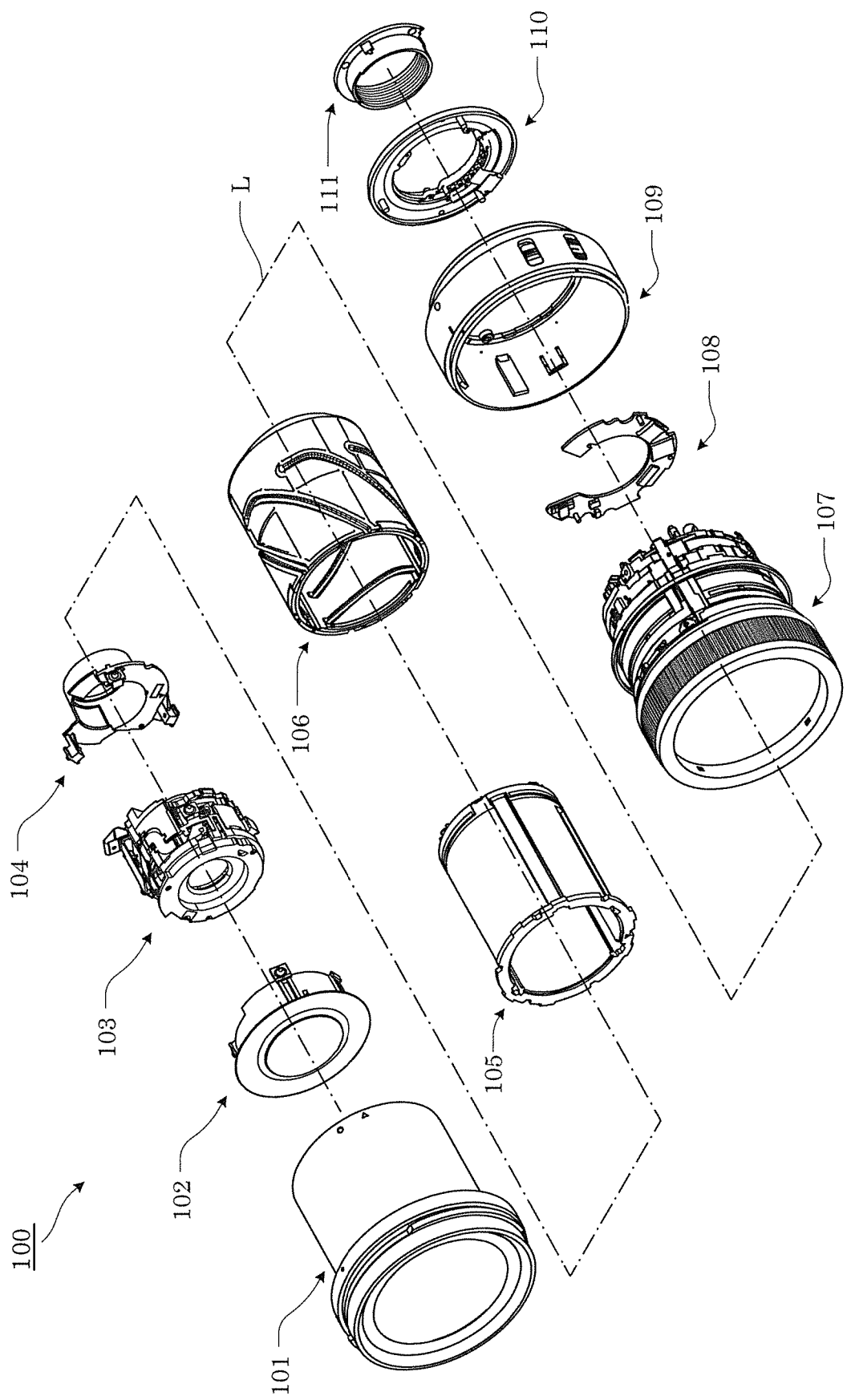
FIG. 2 is an exploded perspective view of the lens barrel according to the embodiment.

Hereinafter, the configuration of a lens barrel according to an embodiment will be described with reference to the drawings. FIG. 1 is a perspective view of the outline configuration of lens barrel 100 according to the embodiment. FIG. 2 is an exploded perspective view of lens barrel 100 according to the embodiment.

As illustrated in FIG. 1, lens barrel 100 is a lens barrel that is detachably attached to camera body 1. As illustrated in FIG. 2, lens barrel 100 includes, first group unit 101, second group unit 102, third-to-fourth group unit 103, fifth unit 104, fixing frame 105, cam frame 106, and exterior unit 107.

Lens barrel 100 is completed by assembling the respective elements in the subsequent order. First, fixing frame 105, fifth unit 104, third-to-fourth group unit 103, and second group unit 102 are sequentially assembled into cam frame 106. Subsequently, cam frame 106 into which the respective elements have been assembled is assembled into first group unit 101. Lens barrel 100 is completed by assembling the respective elements in the order stated above.

In addition, lens barrel 100, which is assembled into rear frame unit 109 together with board unit 108, is assembled into camera body 1, via lens mount 110 and light shielding frame 111.

Board unit 108 is a unit for driving lens barrel 100, and includes a printed board on which electric components, electric contact portions, etc., are mounted. Rear frame unit 109 is a member that covers the outer circumference of the end portion of exterior unit 107 on camera body 1 side. Lens mount 110 is a connection element for connecting and fixing lens barrel 100 and rear frame unit 109 to camera body 1. Light shielding frame 111 is a member which is disposed between lens mount 110 and camera body 1 and blocks out unwanted light.

Lens barrel 100 is configured so that, when a zoom ring provided in exterior unit 107 is rotated, cam frame 106 rotates according to the rotation of the zoom ring. Lens barrel 100 is configured so that, when cam frame 106 rotates, first group unit 101, second group unit 102, third-to-fourth group unit 103, and fifth unit 104 move along optical axis L. Each of the units has a cam pin that engages with a cam groove formed in cam frame 106. Furthermore, each of the units has a forward-movement key that engages with a groove portion formed in fixing frame 105. This enables the respective units to move along optical axis L relative to fixing frame 105 and cam frame 106.

Furthermore, third-to-fourth group unit 103 has a mechanism for image stabilization and a mechanism for focus adjustment, and image stabilization lens movement and focus lens movement during image capturing are driven by these mechanisms.

2. Third-to-Fourth Group Unit

Next, third-to-fourth group unit 103 will be described in detail.

[2-1. Overall Configuration]

Figure 3:
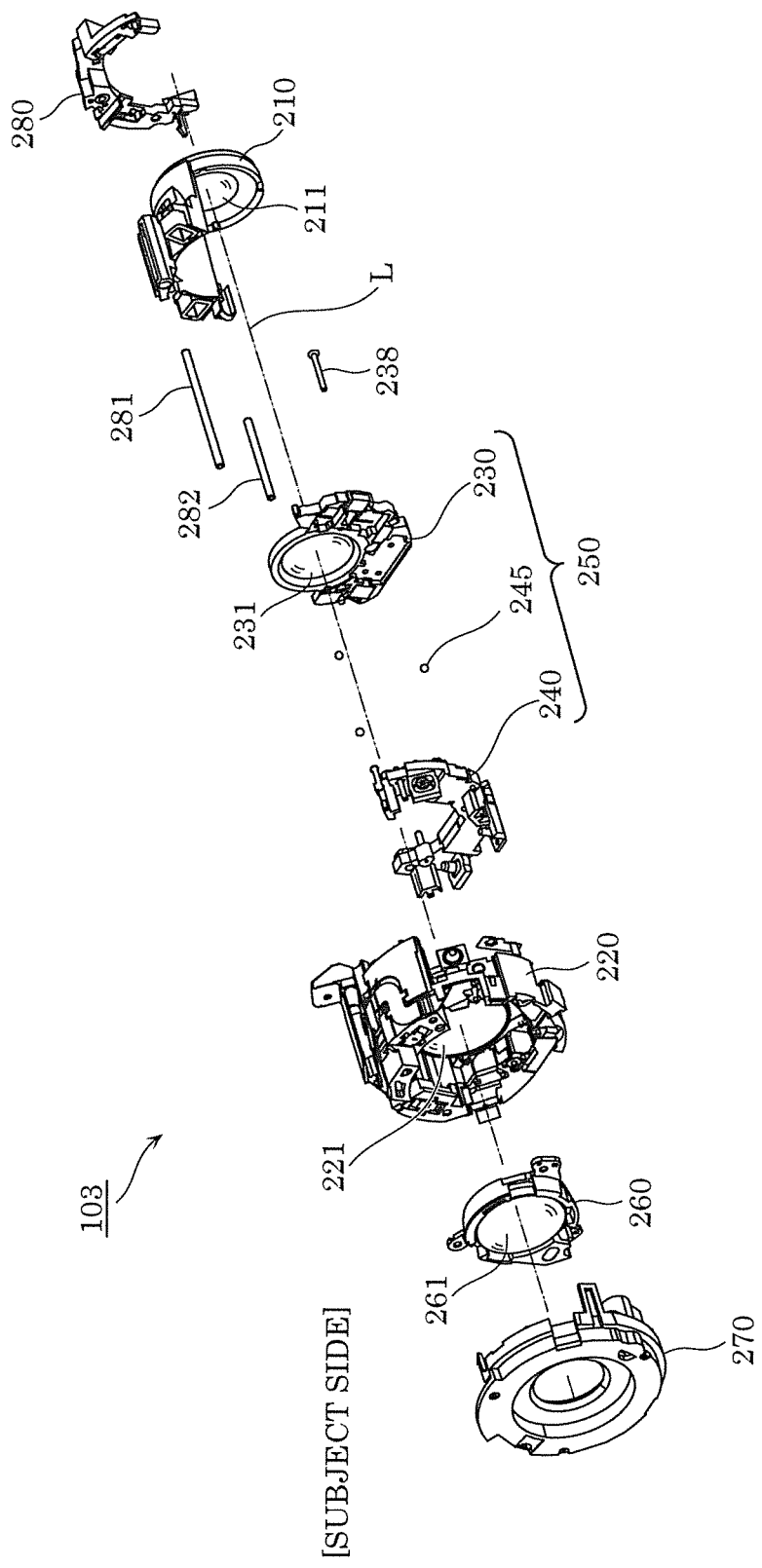
FIG. 3 is an exploded perspective view of a third-to-fourth group unit according to the embodiment.

First, the overall configuration of third-to-fourth group unit 103 according to this embodiment will be described. FIG. 3 is an exploded perspective view of third-to-fourth group unit 103 according to this embodiment. As illustrated in FIG. 3, third-to-fourth group unit 103 includes shaft holding frame 280, first lens frame 210, image stabilization unit 250, second lens frame 220, front frame 260, and diaphragm unit 270.

First lens frame 210 is an auto focus lens frame that is moved along optical axis L by two linear units to be described later, and holds first lens 211 which is a focus lens. It should be noted that a fourth group unit of lens barrel 100 includes first lens frame 210, first lens 211 held by first lens frame 210, etc.

Second lens frame 220 is a frame body that holds second lens 221 and holds first lens frame 210 movably along optical axis L. It should be noted that the number of lenses held by second lens frame 220 may be two or more.

Specifically, two shafts (main shaft 281 and auxiliary shaft 282) extend between second lens frame 220 and shaft holding frame 280 which is fixed to second lens frame 220, and first lens frame 210 moves along optical axis L while being guided by main shaft 281 and auxiliary shaft 282. More specifically, first lens frame 210 moves along optical axis L while following main shaft 281 and having rotary motion around main axis 281 restricted by auxiliary axis 282. In other words, second lens frame 220 holds first lens frame 210 movably along optical axis L, via main shaft 281 and auxiliary shaft 282. It should be noted that each of main shaft 281 and auxiliary shaft 282 is an example of a shaft member that guides the movement of first lens frame 210 along optical axis L.

It should be noted that, together with front frame 260 which is disposed on the subject side (the side on which the subject to be image-captured using lens barrel 100 is present) of second lens frame 220 and holds fourth lens 261, second lens frame 220 is included in the third group unit in lens barrel 100.

Image stabilization unit 250 includes base frame 240 which is to be attached to second lens frame 220, and third lens frame 230 which holds third lens 231 which is an image stabilization lens. Third lens frame 230 is attached to base frame 240, for example, by the force exerted by a plurality of springs not illustrated in the figure, and with a plurality of ball bearings 245 interposed between third lens frame 230 and base frame 240. Furthermore, third lens frame 230 is prevented from falling off from base frame 240 by retaining pin 238, and is moved in a direction perpendicular to optical axis L relative to base frame 240 by two drivers to be described later.

Diaphragm unit 270 has diaphragm blades (not illustrated in the figure), etc., and has a function of regulating exposure during image capturing.

[2-2. Linear Units]

Figure 4:
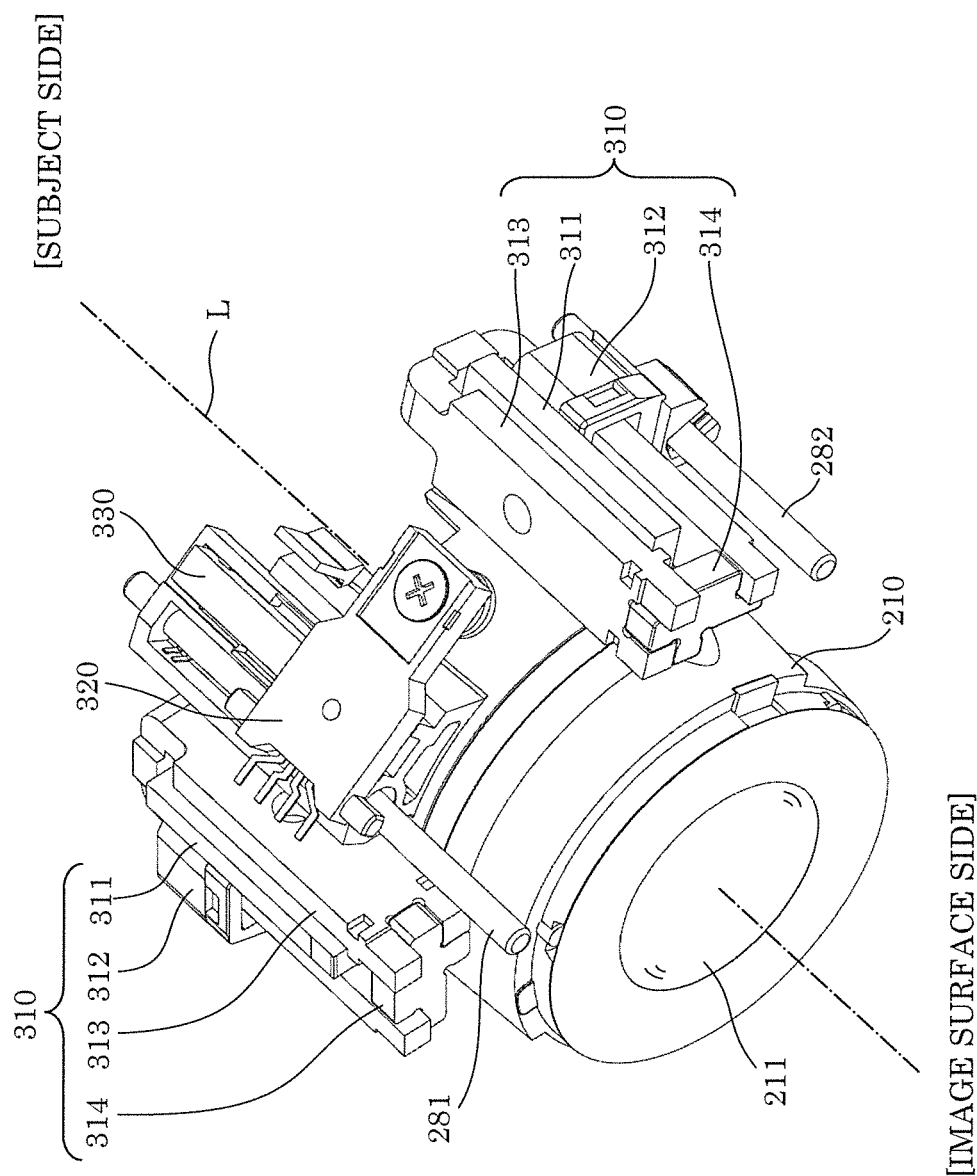
FIG. 4 is a perspective view of a configuration of linear units according to the embodiment.

Next, linear units 310 according to this embodiment will be described. FIG. 4 is a perspective view of a configuration of linear units 310 according to this embodiment.

Linear units 310 are devices that drive the movement along optical axis L of first lens frame 210 which holds first lens 211 which is a focus lens. In this embodiment, the movement of first lens frame 210 is driven by two (a pair of) linear units 310. In this embodiment, as illustrated in FIG. 4, the pair of linear units 310 are disposed along the outer circumference of first lens frame 210, at mutually non-opposing positions across optical axis L.

Each linear unit 310 includes linear drive coil 312, linear drive magnet 311, yoke 313, and opposing yoke 314. It should be noted that linear unit 310 is an example of a first driver, and linear drive coil 312 and linear drive magnet 311 are examples of a first coil and a first magnet, respectively.

Linear drive coil 312 is fixed to first lens frame 210, and linear drive magnet 311, yoke 313, and opposing yoke 314 are fixed to second lens frame 220 (see FIG. 3) which is not illustrated in FIG. 4.

In linear unit 310 having the above-described configuration, the flow of current through linear drive coil 312 causes linear drive coil 312 to move relatively along the longitudinal direction of linear drive magnet 311. Accordingly, first lens frame 210 to which linear drive coil 312 is fixed, moves along optical axis L while being guided by main shaft 281 and auxiliary shaft 282. In other words, first lens frame 210 moves along optical axis L according to the driving force generated by linear unit 310.

Furthermore, as illustrated in FIG. 4, sensor magnet 330 is fixed to first lens frame 210, and magnet resistive (MR) sensor 320 is disposed in the vicinity of sensor magnet 330. MR sensor 320 detects the position the position of first lens frame 210 along optical axis L. The result of the detection by MR sensor 320 is used in controlling the movement of first lens frame 210 along optical axis L, or in other words, focus control.

In this embodiment, high-speed movement of first lens frame 210, that is, high-speed auto focus is achieved, by driving the movement of first lens frame 210 along optical axis L using two linear units 310 having the above-described configuration.

[2-3. Image Stabilization Unit]

Figure 5:
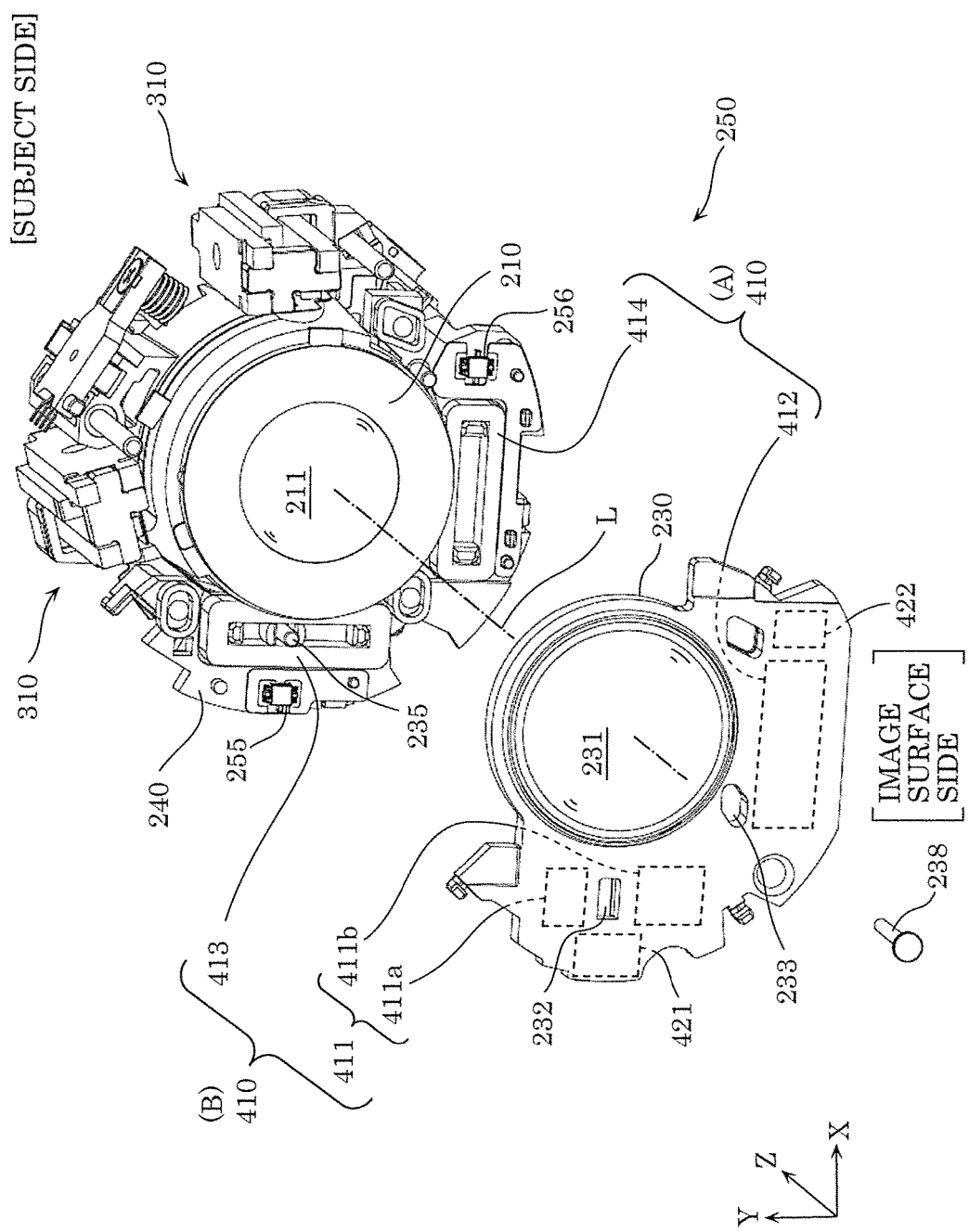
FIG. 5 is a first perspective view of a configuration of an image stabilization unit according to the embodiment.

Next, image stabilization unit 250 according to this embodiment will be described. FIG. 5 is a first perspective view of a configuration of image stabilization unit 250 according to this embodiment. It should be noted that, in FIG. 5, in order to facilitate understanding of the configuration of image stabilization unit 250, third lens frame 230 is shown separated from base frame 240. As such, in FIG. 5, third lens 231 which is an image stabilization lens is positioned closer to the image surface than is first lens 211 which is a focus lens. However, in the state where third lens frame 230 is attached to base frame 240, third lens 231 is positioned between first lens 211 and second lens 221, for example, as illustrated in FIG. 3. Furthermore, illustration of other members such as ball bearings 245 (see FIG. 3) interposed between third lens frame 230 and base frame 240 is omitted. In addition, the approximate external shape of each magnet (411, 412, 421, and 422) disposed on the subject side (positive side of the Z-axis in FIG. 5) of third lens frame 230 is represented by dotted lines.

Image stabilization unit 250 is a unit for compensating image blur caused by what is called camera shake, etc., by moving third lens 231 in a direction perpendicular to optical axis L (i.e., a direction parallel to XY plane in FIG. 5). Specifically, image stabilization unit 250 is for example a unit called an optical image stabilizer (OIS).

Specifically, in image stabilization unit 250, third lens frame 230 which holds third lens 231 is moved in a direction perpendicular to optical axis L by two (a pair of) stabilization drivers 410. Each stabilization driver 410 includes a coil and a magnet. It should be noted that stabilization driver 410 is an example of a second driver.

Here, out of the pair of stabilization drivers 410 illustrated in FIG. 5, stabilization driver 410 disposed in an orientation in which the longitudinal direction is parallel to the X-axis is denoted as stabilization driver A and stabilization driver 410 disposed in an orientation in which the longitudinal direction is parallel to the Y-axis is denoted as stabilization driver B. In this case, the configuration and operation of image stabilization unit 250 are as described below.

Stabilization driver A includes OIS drive magnet 412 and OIS drive coil 414, and generates drive force for moving third lens frame 230 in the pitch direction (the Y-axis direction). Stabilization driver B includes OIS drive magnet 411 and OIS drive coil 413, and generates drive force for moving third lens frame 230 in the yaw direction (the X-axis direction).

Each of OIS drive coil 414 and OIS drive coil 413 is an example of a second coil, and each of OIS drive magnet 412 and OIS drive magnet 411 is an example of a second magnet. Furthermore, OIS drive coil 414 and OIS drive coil 413 are fixed to base frame 240, OIS drive magnet 412 and OIS drive magnet 411 are fixed to third lens frame 230.

In stabilization driver A having the above-described configuration, the flow of current through OIS drive coil 414 causes OIS drive magnet 412 to move along the transverse direction of OIS drive magnet 412 (the Y-axis direction) relative to OIS drive coil 414.

Furthermore, in stabilization driver B having the above-described configuration, the flow of current through OIS drive coil 413 causes OIS drive magnet 411 to move along the transverse direction of OIS drive magnet 411 (the X-axis direction) relative to OIS drive coil 413. It should be noted that OIS drive magnet 411 includes two partial magnets (partial magnets 411a and 411b) aligned in the Y-axis direction, and, in this embodiment, the transverse direction of OIS drive magnet 411 is a direction orthogonal to the alignment direction of partial magnets 411a and 411b.

Furthermore, third lens frame 230 which holds third lens 231 is movable in a direction perpendicular to optical axis L, relative to base frame 240 to be attached to second lens frame 220 (see FIG. 3). Stated differently, third lens frame 230 is held by second lens frame 220 via base frame 240, so as to be movable in a direction perpendicular to optical axis L.

In this state, when the driving force of at least one of stabilization drivers A and B acts on third lens frame 230, third lens frame 230 moves in a direction perpendicular to optical axis L according to the resultant force of the driving forces of stabilization drivers A and B. Furthermore, by controlling the current that flows through the coils (414 and 413) of stabilization drivers A and B, the movement of third lens frame 230, that is, the position, movement speed, etc., of third lens 231 which is an image stabilization lens is controlled.

More specifically, as illustrated in FIG. 5, in third lens frame 230, yaw sensor magnet 421 is fixed at a position on a side of OIS drive magnet 411, and pitch sensor magnet 422 is fixed at a position on a side of OIS drive magnet 412. Furthermore, in base frame 240, position sensor 255, which is a hole element, is fixed at a position opposite to yaw sensor magnet 421, and position sensor 256, which is a hole element, is fixed at a position opposite to pitch sensor magnet 422. In this configuration, position sensor 255 detects the position of third lens frame 230 on the X-axis, and position sensor 256 detects the position of third lens frame 230 on the Y-axis. The movement of third lens frame 230 is controlled based on these detection results. In this manner, blurring (image blur) of the image captured using lens barrel 100 is reduced.

Furthermore, third lens frame 230 is prevented from falling off from base frame 240 by way of the tip portion of retaining pin 238, which has been inserted through through-hole 233, being passed through base frame 240 and fixed to second lens frame 220. In addition, by inserting restricting pin 235 protruding from base frame 240, into engaging hole 232 of third lens frame 230, movement of third lens frame 230 in at least one direction perpendicular to optical axis L is restricted. Accordingly, for example, significant movement by third lens frame 230 which is inherently unnecessary is suppressed. It should be noted that, in this embodiment, engaging hole 232 is a hole which is elongated in the X-axis direction, and mainly restricts the amount of movement of third lens frame 230 along the Y-axis.

Here, restricting pin 235 needs to be disposed further outward relative to optical axis L than the lens group of first lens 211, second lens 221, third lens 231, etc., and, in consideration of the miniaturization of image stabilization unit 250, is for example disposed at a position close to optical axis L. In addition, restricting pin 235 needs to be fixed to base frame 240.

In view of this, in lens barrel 100 according to this embodiment, restricting pin 235 is disposed in the area in which one of the pair of stabilization drivers 410 (stabilization driver B in FIG. 5) is present, when seen in the optical axis L direction. Specifically, as illustrated in FIG. 5, restricting pin 235 is disposed passing through the central hole of OIS drive coil 413 of stabilization driver B, which is fixed to base frame 240. Furthermore, OIS drive magnet 411 located at a position opposite to OIS drive coil 413 is divided into two partial magnets (partial magnets 411a and 411b), and engaging hole 232 is formed between these two partial magnets 411a and 411b. In other words, restricting pin 235 is disposed utilizing the area between the two partial magnets 411a and 411b.

Furthermore, in this embodiment, third lens frame 230, which moves in a direction perpendicular to optical axis L, is held by second lens frame 220 via base frame 240. For this reason, adjustment of third lens frame 230 in the basic state (the state in which driving force for moving is not provided) is performed by adjusting the orientation of base frame 240. Specifically, during the manufacturing (assembly) of lens barrel 100, fine adjustment is performed so that third lens 231 used for image stabilization is disposed in the normal orientation. Base frame 240 according to this embodiment has a structure for such fine adjustment.

Figure 6:
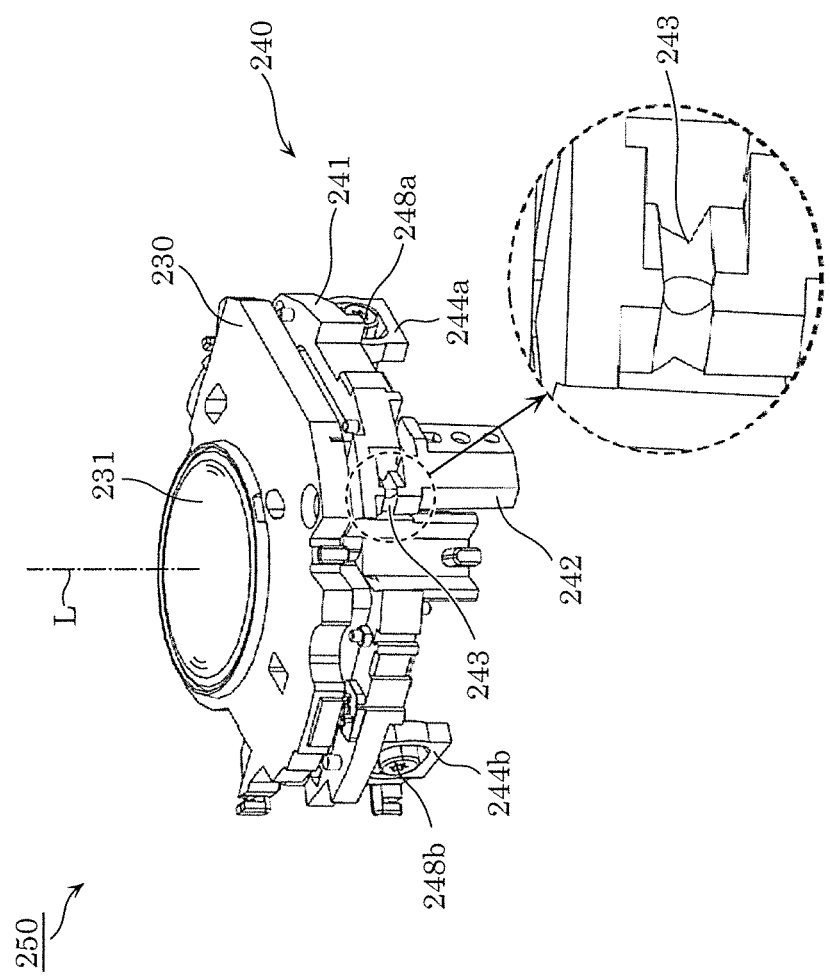
FIG. 6 is a second perspective view of the configuration of the image stabilization unit according to the embodiment.

FIG. 6 is a second perspective view of the configuration of image stabilization unit 250 according to this embodiment. It should be noted that, in FIG. 6, illustration of springs that bias third lens frame 230 to base frame 240 is omitted.

As illustrated in FIG. 6, base frame 240 includes base body 241 to which OIS drive coil 413 (see FIG. 5), etc., are fixed and which holds third lens frame 230; and fixing member 242, adjusting member 244a, and adjusting member 244b which are provided protruding from base body 241. A threaded hole is provided in fixing member 242, and fixing member 242 is fixed to second lens frame 220 by a screw not illustrated in the figure.

Furthermore, a noncircular hole for tilt adjustment is formed in each of adjusting members 244a and 244b, and eccentric pins 248a and 248b are inserted in these two noncircular holes. In this configuration, the tilt of base body 241 in two axis directions is changed when respective eccentric pins 248a and 248b are rotated. In this manner, the tilt of third lens frame 230 (third lens 231) is adjusted. At this time, since fixing member 242 of base frame 240 is fixed to second lens frame 220, the orientation of base body 241 relative to fixing member 242 changes. In view of this, connecting portion 243, which is a portion made readily deformable by having a reduced cross-sectional area, is provided in the connection portion of fixing member 242 with base body 241. When connection portion 243 deforms, the tilt of base body 241 in the two axis directions is changed while base body 241 and fixing member 242 are kept connected. In other words, the tilt of third lens 231 can be adjusted.

It should be noted that, after the aforementioned tilt adjustment is performed, fixing (rotation stopping) of eccentric pins 248a and 248b is carried out by injecting and hardening of resin in the respective noncircular holes of adjusting members 244a and 244b, for example. Accordingly, base body 241 is fixed in the orientation after the aforementioned tilt adjustment.

Furthermore, since connecting portion 243 is a part of base frame 240 which is, for example, an integrally molded component made from resin, a different component such as a hinge for connecting base body 241 and fixing member 242 is not required. This is advantageous from the point of view of, for example, simplifying the assembly process of lens barrel 100 or miniaturizing image stabilization unit 250, etc.

3. Advantageous Effects, Etc.

Figure 7:
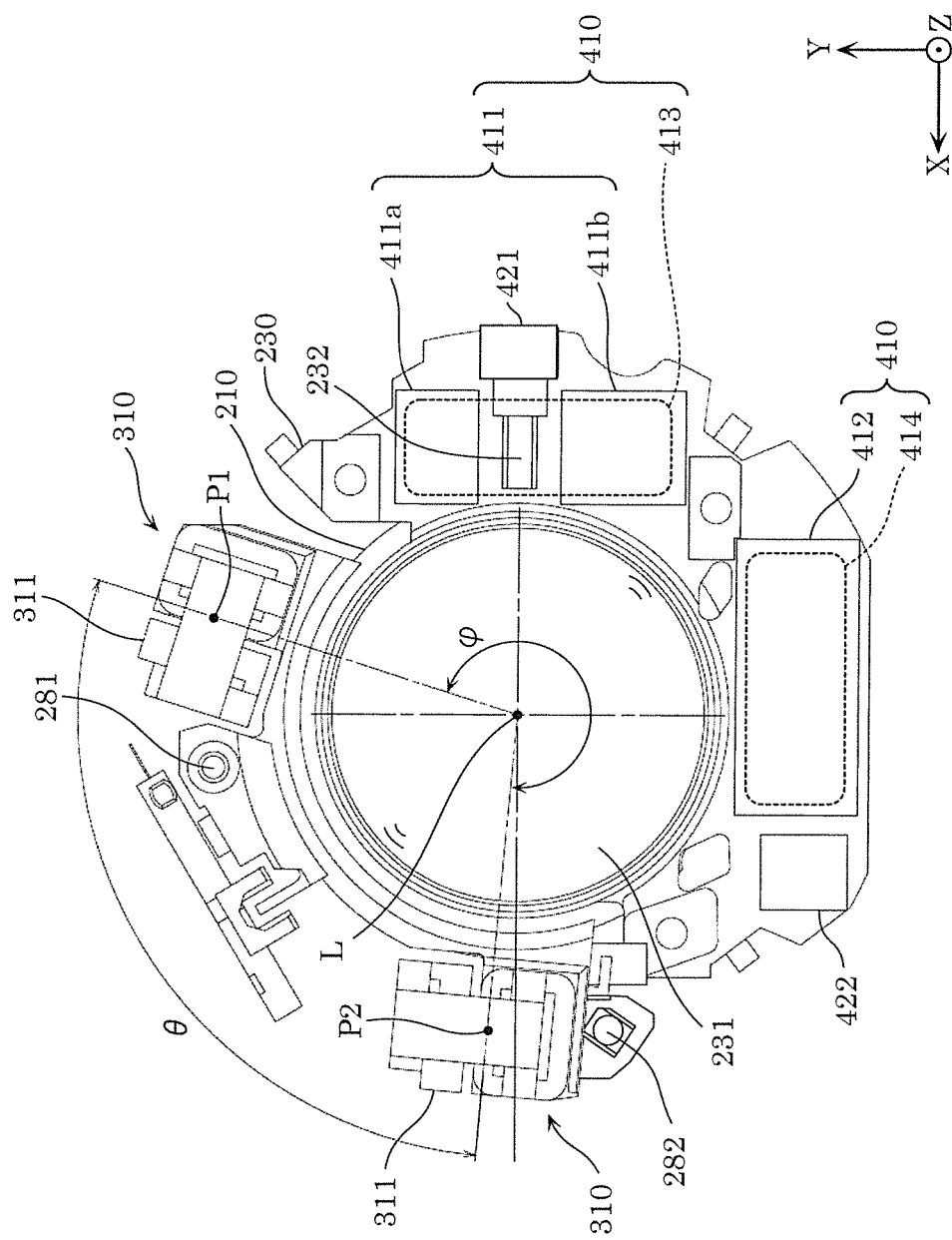
FIG. 7 is a diagram illustrating the placement positions of a pair of linear units and a pair of stabilization drivers when seen in the optical axis direction.

As described above, lens barrel 100 according to this embodiment includes first lens frame 210 which holds first lens 211, and second lens frame 220 which holds second lens 221 and holds first lens frame 210 movably along optical axis L. Lens barrel 100 further includes a pair of linear units 310 which drive movement of first lens frame 210 along optical axis L. As illustrated in FIG. 7, when seen in the optical axis L direction, the pair of linear units 310 are disposed along the outer circumference of first lens frame 210, at mutually non-opposing positions across optical axis L. FIG. 7 is a diagram illustrating the arrangement positions of the pair of linear units 310 and the pair of stabilization drivers 410 according to this embodiment, when seen in the optical axis L direction.

In this manner, in this embodiment, two linear units 310 are used in driving the movement of first lens 211, which is a focus lens, along optical axis L, and this enables high-speed autofocus.

Furthermore, by disposing the pair of linear units 310 at mutually non-opposing positions across optical axis L, a relatively large three-dimensional space continuing along the circumferential direction is created in the outer circumference of first lens frame 210 when seen in the optical axis L direction. For this reason, this three-dimensional space can be effectively utilized in the placement of other elements of lens barrel 100, and, as a result, lens barrel 100 can be miniaturized.

Specifically, in this embodiment, the pair of stabilization drivers 410 are disposed utilizing this three-dimensional space. Specifically, lens barrel 100 according to this embodiment further includes: third lens 231 (see FIG. 3) disposed between first lens 211 and second lens 221; third lens frame 230 which holds third lens 231; and a pair of stabilization drivers 410 which drive the movement of third lens frame 230 in a direction perpendicular to optical axis L. Third lens frame 230 is held by second lens frame 220 movably in a direction perpendicular to optical axis L. It should be noted that, in this embodiment, third lens frame 230 is held by second lens frame 220 via base frame 240.

Furthermore, as illustrated in FIG. 7, when seen in the optical axis L direction, the pair of stabilization drivers 410 are disposed along the outer circumference of first lens frame 210, and within an angle range defined by $\varphi$ which is the larger of two angles ($\theta$ and $\varphi$ ($\varphi=360°-\theta$)) formed between the pair of linear units 310 and centered on optical axis L. Furthermore, as can be understood from FIG. 5, for example, the pair of linear units 310 and the pair of stabilization drivers 410 are disposed at overlapping positions, when seen in a direction perpendicular to optical axis L.

In this manner, in this embodiment, the pair of stabilization drivers 410 are disposed utilizing the three-dimensional space in which the pair of linear units 310, which drive the movement of first lens frame 210 along optical axis L, are not disposed. For this reason, the pair of linear units 310 and the pair of stabilization drivers 410 can be disposed at positions which are crossed by a single plane perpendicular to optical axis L (i.e., can be disposed on the same plane).

Here, if the pair of linear units 310 were to be disposed at opposing positions across optical axis L, the pair of linear units 310 would need to be disposed closer to the image surface than the pair of stabilization drivers 410 are, for example, in order to avoid interference with the pair of stabilization drivers 410. This is because the pair of stabilization drivers 410 are drive devices which drive the movement of third lens frame 230 in a direction perpendicular to optical axis L (movement within an XY plane in FIG. 7), and need to be arranged in an L shape along first lens frame 210, as illustrated in FIG. 7. Specifically, when the pair of stabilization drivers 410 are arranged in an L shape, it is substantially impossible to dispose the pair of stabilization drivers 410 in the same plane with the pair of linear units 310 which are located at opposite positions across optical axis L.

With regard to this point, in this embodiment, since the pair of linear units 310 are disposed at mutually non-opposing positions across optical axis L, the pair of stabilization drivers 410 and the pair of linear units 310 can be aligned in the circumferential direction of first lens frame 210 (first lens 211) so as to be disposed in the same plane. Stated differently, the pair of stabilization drivers 410 and the pair of linear units 310 can be aligned in the aforementioned circumferential direction so as to be disposed in the same plane, by utilizing the three-dimensional space in which the pair of stabilization drivers 410, which arranged in an L shape, are not disposed.

Furthermore, assume the case where three or more linear units 310 for driving the movement of first lens frame 210 are disposed at substantially equal intervals along the outer circumference of first lens frame 210. In this case, it is substantially impossible to dispose the pair of stabilization drivers 410, which are arranged in an L shape, in the same plane with the three or more linear units 310. With regard to this point, in this embodiment, there are only two linear units 310 for driving the movement of first lens frame 210, and the two linear units 310 are disposed along the outer circumference of first lens frame 210 and at mutually non-opposing positions across optical axis L. For this reason, a three-dimensional space sufficient for arranging the pair of stabilization drivers 410 and the two linear units 310 in the same plane is formed in an area along the outer circumference of first lens frame 210.

It should be noted that by disposing the pair of stabilization drivers 410 which are arranged in an L shape outward or inward of the pair of linear units 310 which are located at opposite positions across optical axis L, for example, it would be physically possible to arranged the pair of stabilization drivers 410 and the pair of linear units 310 in the same plane. Specifically, by offsetting the pair of linear units 310 and the pair of stabilization drivers 410 in a direction perpendicular to optical axis L, they can be arranged in the same plane.

However, in this case, there arises the problem that the outer diameter of third-to-fourth group unit 103 significantly increases, for example. With regard to this point, in lens barrel 100 according to this embodiment, the pair of linear units 310 and the pair of stabilization drivers 410 are aligned in the circumferential direction of first lens frame 210 (first lens 211). As such, the pair of linear units 310 and the pair of stabilization drivers 410 are disposed in the same plane without substantially increasing the outer diameter of third-to-fourth group unit 103.

In this manner, according to lens barrel 100 according to this embodiment, the length of third-to-fourth group unit 103 (see FIG. 3) in the optical axis L direction can be shortened compared to when the pair of stabilization drivers 410 and the pair of linear units 310 are arranged offset in the optical axis L direction. Furthermore, the external radius of third-to-fourth group unit 103 can be reduced compared when the pair of stabilization drivers 410 and the pair of linear units 310 are arranged offset in a direction orthogonal to optical axis L. In this manner, lens barrel 100 according to this embodiment achieves both size reduction and high-speed auto focus through a plurality of linear units 310.

Furthermore, in this embodiment, as described above, each of the pair of linear units 310 includes linear drive coil 312 which is fixed to first lens frame 210 and linear drive magnet 311 which is fixed to second lens frame 220. As illustrated in FIG. 4 and FIG. 7, linear drive coil 312 and linear drive magnet 311 are aligned along the outer circumference of first lens frame 210 when seen in the optical axis L direction.

In this case, the outer diameter of third-to-fourth group unit 103 (see FIG. 3) can be reduced further than when linear drive coil 312 and linear drive magnet 311 are, for example, aligned radially about optical axis L (radial direction of first lens 211). This is advantageous for the miniaturization of lens barrel 100.

Furthermore, in this embodiment, as illustrated in FIG. 4 and FIG. 7 for example, the longitudinal direction of linear drive magnet 311 of each of the pair of linear units 310 in the cross-section perpendicular to optical axis L is oriented along a radial direction about optical axis L (more specifically, is oriented parallel to the radial direction). Specifically, linear drive magnet 311 is disposed so that a relatively wide face of linear drive magnet 311 is oriented opposite to linear drive coil 312. Because of this, linear unit 310 can efficiently generate driving force, for example.

Here, angle θ formed by the pair of linear units 310 and optical axis L illustrated in FIG. 7 is defined as the angle formed by the line connecting respective thrust generation points P1 and P2 of the pair of linear units 310 and optical axis L, when seen in the optical axis L direction for example. It should be noted that, for example, the respective centers of gravity of the pair of linear units 310 when seen in the optical axis L direction can be considered as the respective thrust generation points P1 and P2 of the pair of linear units 310.

Thus, θ defined in the above manner is a value smaller than 180°, and is for example any value within the range of 100° to 105° in this embodiment.

Furthermore, focusing on the alignment order of the respective linear drive coils 312 and linear drive magnets 311 of the pair of linear units 310, the two linear drive magnets 311 are disposed at opposite positions in the circumferential direction of first lens frame 210 as illustrated in FIG. 7 for example. Specifically, when seen in the angle range defined by θ, linear drive coil 312 is disposed outward of linear drive magnet 311 in each of the pair of linear units 310.

Stated differently, when seen in the optical axis L direction, two distances are defined as distances between the two linear drive magnets 311 along the circumferential direction of first lens frame 210, and the two linear drive coils 312 are disposed within the range of the longer of the two distances. Accordingly, the stability of the movement of second lens frame 210 is improved.

Specifically, between linear drive magnet 311 and linear drive coil 312 of linear unit 310, the one that is fixed to first lens frame 210 is linear drive coil 312. In other words, the movement of first lens frame 210 is directly driven by linear drive coil 312. Therefore, from the point of view of having first lens frame 210 supported in a balanced manner and moved stably by the two linear drive coils 312, the two linear drive coils 312 are, for example, disposed at opposite positions across optical axis L. However, in this embodiment, as described above, three-dimensional spaces for placing the pair of stabilization drivers 410 are created by arranging the pair of linear units 310 at mutually non-opposing positions across optical axis L. Therefore, the two linear drive coils 312 cannot be disposed at opposite positions across optical axis L.

In view of this, in this embodiment, the two linear drive coils 312 are disposed within the range of the longer of the two distances along the circumferential direction of first lens frame 210, between the two linear drive magnets 311. Specifically, each of the two linear drive coils 312 are disposed outward of linear drive magnet 311 so that the angle formed by optical axis L and the two linear drive coils 312 becomes wide (i.e., approaches 180°). Because of this, it is possible to improve the stability of the movement of first lens frame 210 under the condition that the pair of linear units 310 are disposed at non-opposing positions across optical axis L. Because of this, stable driving is possible without disrupting the balance of thrust.

Furthermore, in this embodiment, shaft members that guide the movement of first lens frame 210 along optical axis L are each disposed on the side of one of the pair of linear units 310 in the circumferential direction of first lens frame 210 (circumferential direction of first lens 211).

Specifically, as illustrated in FIG. 7, main shaft 281 is disposed on the side of linear unit 310 disposed on the positive Y-axis side of first lens frame 210, and auxiliary shaft 282 is disposed on the side of linear unit 310 disposed on the positive X-axis side of first lens frame 210. Specifically, shafts (main shaft 281 and auxiliary shaft 282) that guide the movement of first lens frame 210 are disposed near thrust generation points P1 and P2 of the pair of linear units 310. With this, for example, wobbling with respect to main shaft 281 and auxiliary shaft 282 during movement of first lens frame 210 is suppressed, and movement of first lens frame 210 can be performed efficiently and smoothly.

Furthermore, since linear unit 310 and a shaft (main shaft 281 or auxiliary shaft) are aligned in the circumferential direction of first lens frame 210, the outer diameter of third-to-fourth group unit 103 (see FIG. 3) can be reduced compared to the case where they are aligned radially about optical axis L. This is advantageous for the miniaturization of lens barrel 100.

The pair of linear units 310 arranged in this manner can also be arranged at biased positions relative to first lens frame 210 when seen in the optical axis L direction, for example. As such, first lens frame 210 may become unstable (bend or vibrate) during the driving of first lens frame 210 along optical axis L by the pair of linear units 310, for example.

Figure 8:
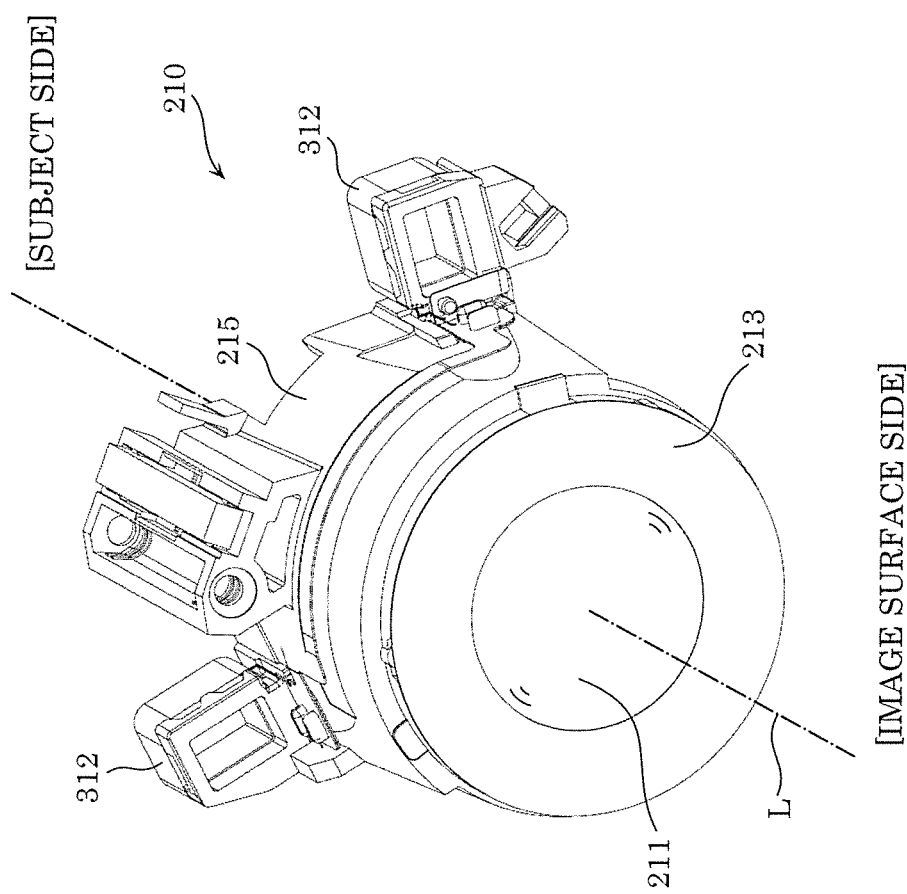
FIG. 8 is a perspective view of an outline configuration of a first lens frame according to the embodiment.

However, in this embodiment, as illustrated in FIG. 8, first lens frame 210 has a structure for ensuring stability during movement according to the pair of linear units 310.

FIG. 8 is a perspective view of the outline configuration of lens barrel 210 according to this embodiment. As illustrated in FIG. 8, first lens frame 210 includes frame 213 to which first lens 211 is fixed, and wall portion 215 extending from frame portion 213 in the optical axis L direction, continuously between linear drive coils 312 of each of the pair of linear units 310 in the circumferential direction of frame portion 213.

In this manner, since the two linear drive coils 312 which directly provide the driving force for moving first lens frame 210 to first lens frame 210 are connected by wall portion 215, the rigidity or strength of first lens frame 210 as a whole improves. This ensures the stability of first lens frame 210 during movement of first lens frame 210 by the pair of linear units 310 located at biased positions relative to first lens frame 210.

Furthermore, in this embodiment, some thought has also been put into image stabilization unit 250 with regard to contributing to miniaturization. Specifically, lens barrel 100 according to this embodiment further includes restricting pin 235 which restricts movement of third lens frame 230 in at least one direction perpendicular to optical axis L. Either one of the pair of stabilization drivers 410 includes OIS drive magnet 411 which is fixed to third lens frame 230 and includes two partial magnets 411a and 411b which are separated. Restricting pin 235 is disposed inserted into engaging hole 232 provided in third lens frame 230, at a position between the two partial magnets 411a and 411b.

In this manner, by configuring OIS drive magnet 411 of stabilization driver 410 using a plurality of mutually separated partial magnets, restricting pin 235 can be placed by utilizing the area between the two partial magnets 411a and 411b. Accordingly, for example, miniaturization of image stabilization unit 250 becomes possible.

Here, when OIS drive magnet 411 is formed by the two partial magnets 411a and 411b, it is possible to increase the widths of partial magnets 411a and 411b in the Y-axis direction (see FIG. 5) in order to ensure OIS drive magnet 411 has sufficient volume. Even in such a case, since the longitudinal direction of OIS drive magnet 411 (i.e., the alignment direction of partial magnets 411a and 411b) is a direction orthogonal to the radial direction of first lens frame 210, the increase in the widths of partial magnets 411a and 411b in the aforementioned longitudinal direction has little effect on the increase in the outer diameter of third-to-fourth group unit 103.

Other Embodiments

Hereinbefore, techniques disclosed in the present application have been exemplified by way of the above described embodiments. However, the techniques disclosed in the present disclosure are not limited to these examples, and can also be applied to embodiments in which modifications, replacements, additions, and omissions have been made.

For example, when first lens frame 210 is seen from the optical axis L direction, an element different from the pair of stabilization drivers 410 may be disposed in the space in which the pair of linear units 310 are not disposed. Specifically, a component to be included in lens barrel 100, such as some sort of sensor, electronic circuit, or harness, can be housed by utilizing the relatively wide three-dimensional space created by disposing the pair of linear units 310 at mutually non-opposing positions across optical axis L.

Furthermore, lens barrel 100 may include, for example, three linear units 310. For example, in FIG. 7, one linear unit 310 may additionally be included within the angle range defined by θ. Accordingly, further high-speed movement by first lens frame 210 (in other words, further high-speed auto focus) is realized. Furthermore, as long as the area in which the three linear units 310 are present falls within the angle range defined by θ when seen in the optical axis L direction, the three linear units 310 and the pair of stabilization drivers 410 arranged in an L shape can also be arranged in the same plane. Stated differently, three or more linear units may be disposed in a space which extends along the outer circumference of first lens frame 210 and at which the pair of stabilization drivers 410 are not disposed.

Furthermore, the number of lenses held by a lens holder such as first lens frame 210 is not limited to one. For example, the number, type, shape, and size of lenses to be held by the respective holders may be determined in order to satisfy various conditions demanded of lens barrel 100.

Furthermore, there is no particular limitation on the image capturing device in which lens barrel 100 is included, and lens barrel 100 may be included in a video camera that image-captures video. Furthermore, by applying the structure of lens barrel 100 according to this embodiment to the lens barrel included in a portable terminal, such as a smartphone for example, the portable terminal can be miniaturized.

Hereinbefore, the techniques disclosed in the present disclosure have been exemplified by way of the foregoing embodiments. The enclosed drawings and detailed description are provided for this reason.

Therefore, the elements recited in the enclosed drawings and detailed description may include, aside from elements essential to solving the aforementioned problems, elements not essential to solving the aforementioned problems. As such, the recitation of these non-essential elements in the enclosed drawings and detailed description should not be directly interpreted to mean the non-essential elements are essential.

Furthermore, since the foregoing embodiments are for exemplifying the techniques disclosed in the present disclosure, various modifications, replacements, additions, omissions, etc., can be carried out within the scope of the claims or equivalents thereof. In addition the foregoing embodiments, etc. may be combined.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be applied to a lens barrel, etc., included in a digital camera, a video camera, a portable terminal, or the like.

What is claimed is:

1. A lens barrel, comprising:
a first lens frame that holds a first lens;
a second lens frame that holds a second lens, and holds the first lens frame movably along an optical axis; and
a pair of first drivers that drive movement of the first lens frame along the optical axis, wherein
when seen in an optical axis direction, the pair of first drivers are disposed along an outer circumference of the first lens frame, at mutually non-opposing positions across the optical axis,
the pair of first drivers each include:
a first coil fixed to the first lens frame; and
a first magnet fixed to the second lens frame, wherein
when seen in the optical axis direction, the first coil and the first magnet are aligned in a circumferential direction along the outer circumference of the first lens frame, and
the first coil of each of the pair of first drivers is disposed within a range defined by a longer distance out of two distances between the first magnets of the pair of first drivers along the circumferential direction of the first lens frame.

2. The lens barrel according to claim 1, wherein
a longitudinal direction of the first magnet of each of the pair of first drivers in a cross-section perpendicular to the optical axis is oriented along a radial direction about the optical axis.

3. The lens barrel according to claim 1, wherein
the first lens frame includes:
a frame portion to which the first lens is fixed; and
a wall portion extending from the frame portion in the optical axis direction, continuously between the first coils of the pair of drivers in a circumferential direction of the frame portion.

4. The lens barrel according to claim 1, further comprising:
a shaft member that guides the movement of the first lens frame along the optical axis, wherein
the shaft member is disposed on a side of one of the pair of first drivers in the circumferential direction of the first lens frame.

5. A lens barrel, comprising:
a first lens frame that holds a first lens;
a second lens frame that holds a second lens, and holds the first lens frame movably along an optical axis;
a pair of first drivers that drive movement of the first lens frame along the optical axis;
a third lens between the first lens and the second lens;
a third lens frame that holds the third lens, and is held by the second lens frame movably in a direction perpendicular to the optical axis; and
a pair of second drivers that drive movement of the third lens frame in a direction perpendicular to the optical axis, wherein
when seen in an optical axis direction, the pair of first drivers are disposed along an outer circumference of the first lens frame, at mutually non-opposing positions across the optical axis,
when seen in the optical axis direction, the pair of second drivers are disposed along the outer circumference of the first lens frame and within a range defined by a larger angle out of two angles formed between the pair of first drivers and centered on the optical axis, and
when seen in a direction perpendicular to the optical axis, the pair of first drivers and the pair of second drivers are disposed at overlapping positions.

6. The lens barrel according to claim 5, further comprising:
a restricting pin that restricts the movement of the third lens in at least one direction perpendicular to the optical axis, wherein
one of the pair of second drivers includes a second magnet that is fixed to the third lens frame and includes two partial magnets which are separated, and
the restricting pin is disposed inserted in an engaging hole provided at a position between the two partial magnets in the third lens frame.

7. The lens barrel according to claim 5, further comprising:
the pair of first drivers each include:
a first coil fixed to the first lens frame; and
a first magnet fixed to the second lens frame, wherein
when seen in the optical axis direction, the first coil and the first magnet are aligned along the outer circumference of the first lens frame, and
the first coil of each of the pair of first drivers is disposed within a range defined by a longer distance out of two distances between the first magnets of the pair of first drivers along a circumferential direction of the first lens frame.

8. The lens barrel according to claim 7, further comprising:
a restricting pin that restricts the movement of the third lens in at least one direction perpendicular to the optical axis, wherein
one of the pair of second drivers includes a second magnet that is fixed to the third lens frame and includes two partial magnets which are separated, and
the restricting pin is disposed inserted in an engaging hole provided at a position between the two partial magnets in the third lens frame.

9. A lens barrel, comprising:
a first lens frame that holds a first lens;
a second lens frame that holds a second lens, and holds the first lens frame movably along an optical axis; and
a pair of first drivers that drive movement of the first lens frame along the optical axis, wherein when seen in an optical axis direction, the pair of first drivers are disposed along an outer circumference of the first lens frame, at mutually non-opposing positions across the optical axis, the pair of first drivers each include:
- a first coil fixed to the first lens frame; and
- a first magnet fixed to the second lens frame, wherein
  when seen in the optical axis direction, the first coil and the first magnet are aligned along the outer circumference of the first lens frame,
- the first coil of each of the pair of first drivers is disposed within a range defined by a longer distance out of two distances between the first magnets of the pair of first drivers along a circumferential direction of the first lens frame, and
- a longitudinal direction of the first magnet of each of the pair of first drivers in a cross-section perpendicular to the optical axis is oriented along a radial direction about the optical axis.

\* \* \* \* \*